(12) United States Patent
Kim

(10) Patent No.: US 12,221,023 B2
(45) Date of Patent: Feb. 11, 2025

(54) ALIGNMENT JIG FOR LEATHER SHEET AND VELCRO STRUCTURE FOR MANUFACTURING VEHICLE SEAT COVER

(71) Applicant: Man Hyun Kim, Incheon (KR)

(72) Inventor: Man Hyun Kim, Incheon (KR)

(73) Assignee: Man Hyun Kim, Incheon (KR)

( * ) Notice: Subject to any disclaimer, the term of this patent is extended or adjusted under 35 U.S.C. 154(b) by 0 days.

(21) Appl. No.: 18/672,572

(22) Filed: May 23, 2024

(65) Prior Publication Data

US 2024/0391369 A1    Nov. 28, 2024

(30) Foreign Application Priority Data

May 23, 2023  (KR) .................. 10-2023-0066419

(51) Int. Cl.
*B60N 2/58* (2006.01)
*D05B 31/00* (2006.01)

(52) U.S. Cl.
CPC .......... *B60N 2/5891* (2013.01); *B60N 2/5816* (2013.01); *D05B 31/00* (2013.01); *D05D 2209/00* (2013.01)

(58) Field of Classification Search
CPC .... B60N 2/5891; B60N 2/5816; D05B 31/00; D05D 2209/00
See application file for complete search history.

(56) References Cited

FOREIGN PATENT DOCUMENTS

| JP | 1994-26782 U | | 4/1994 |
|---|---|---|---|
| KR | 20-2009-0006280 U | | 6/2009 |
| KR | 10-2014-0035988 A | | 3/2014 |
| KR | 10-1656303 B1 | | 9/2016 |
| KR | 101879242 | * | 7/2018 |
| KR | 102637356 | * | 2/2022 |

* cited by examiner

*Primary Examiner* — Mark R Wendell
(74) *Attorney, Agent, or Firm* — NSIP Law

(57) ABSTRACT

The present invention relates to an alignment jig for aligning leather sheet and a Velcro structure before sewing to couple the leather sheet and the Velcro structure which form a vehicle seat cover. The guide part having the accommodation groove into which the Velcro structure can be inserted and fixed is formed on the lower plate of the alignment jig, and the penetration part is formed in the upper plate thereof. Accordingly, after the Velcro structure is inserted and fixed into the accommodation groove of the guide part, when the leather sheet is placed thereon and the upper plate is closed, the leather sheet and the Velcro structure are aligned automatically, and then, when sewing is performed through the penetration part of the upper plate, the Velcro structure can be accurately aligned and coupled on a predetermined curved path of the leather sheet.

2 Claims, 6 Drawing Sheets

ALIGNMENT JIG FOR LEATHER SHEET AND VELCRO STRUCTURE FOR MANUFACTURING VEHICLE SEAT COVER

CROSS REFERENCE TO RELATED APPLICATIONS

This application claims the benefit under 35 U.S.C. § 119(a) of Korean Patent Application No. 10-2023-0066419 filed on May 23, 2023 in the Korean Intellectual Property Office, the entire disclosures of which is incorporated herein by reference for all purposes.

BACKGROUND OF THE INVENTION

Field of the Invention

The present invention relates to an alignment jig for aligning leather sheet and a Velcro structure before sewing to couple the leather sheet and the Velcro structure which form a vehicle seat cover.

Background Art

In general, a vehicle seat provided in the interior of a vehicle is configured in such a way that the outer side of a foam pad is covered with a seat cover and the seat cover is fixed to the foam pad.

As a conventional method for fixing a seat cover to a foam pad, an edge folding method has been mainly used, but there has been a problem of poor adhesion in the space formed between the foam pad and the cover.

Furthermore, there has been a problem in that due to the poor adhesion between the foam pad and the seat cover, a lot of force from a worker is required to adhere the seat cover to the foam pad, so the work may experience strain on the worker's wrist, arm, etc., when working for a long period of time. Moreover, since there are lots of electric devices for heating wires, ventilation, and movement of a seat inside the vehicle seat, detachment of the seat cover occurs frequently for repairing the electric devices. However, the conventional method has a disadvantage in that it is difficult to easily detach the cover since the fixation method is complex.

To overcome the problems of the conventional seat cover fixation structure, recently, a Velcro type coupling structure that the foam pad has a loop structure and the seat cover has a hook structure formed on cover fabric such that they are coupled with each other has been widely used.

However, according to the conventional technique, when the hook structure is formed on the cover fabric of the seat cover, it is difficult to accurately position the hook structure at a predetermined position of the cover fabric of the seat cover for coupling, and misalignment often occurred. Especially, if the hook structure is formed in a curved shape rather than a straight line, misalignment between the hook structure and the cover fabric frequently occurs.

Accordingly, when the hook structure is not coupled at the correct position of the cover fabric the seat cover is coupled with the foam pad in the misaligned state, the cover fabric is fixed in a twisted state or the adhesion is deteriorated.

Meanwhile, the conventional technique related to the seat cover fixing structure of a vehicle seat is disclosed in Korean Utility Model Publication No. 20-2009-0006280.

SUMMARY OF THE INVENTION

Accordingly, the present invention has been made to solve the above-mentioned problems occurring in the prior arts, and it is an objective of the present invention to provide an alignment jig for leather sheet and a Velcro structure for manufacturing a vehicle seat cover, in which a guide part having an accommodation groove into which a Velcro structure can be inserted and fixed is formed on a lower plate of the alignment jig, and a penetration part is formed in an upper plate thereof, such that after the Velcro structure is inserted and fixed into the accommodation groove of the guide part, when leather sheet is placed thereon and the upper plate is closed, the leather sheet and the Velcro structure are aligned automatically, and then, when sewing is performed through the penetration part of the upper plate, the Velcro structure can be accurately aligned and coupled on a predetermined curved path of the leather sheet.

The objectives of the present invention are not limited to those mentioned above, and other aspects not mentioned herein will be clearly understood by those skilled in the art from the following description.

To accomplish the above object, according to the present invention, there is provided an alignment jig for leather sheet and a Velcro structure for manufacturing a vehicle seat cover, including: a lower plate accommodating the Velcro structure and the leather sheet; and an upper plate rotating by being coupled to the lower plate via a hinge shaft, wherein, the lower plate comprises a guide part for inserting and fixing the Velcro structure.

Moreover, the guide part of the lower plate has an accommodation groove which is formed in a curved shape and into which the Velcro structure can be inserted.

Furthermore, when a core material and a Velcro hook of the Velcro structure are inserted into the accommodation groove of the guide part, a connection member of the Velcro structure protrudes to the side of the accommodation groove.

Additionally, the upper plate has a penetration part formed at a position corresponding to the guide part of the lower plate.

In addition, the penetration part of the upper plate is formed in a wider area than the guide part of the lower plate.

The present invention relates to an alignment jig for aligning leather sheet and a Velcro structure before sewing to couple the leather sheet and the Velcro structure which form a vehicle seat cover. The guide part having the accommodation groove into which the Velcro structure can be inserted and fixed is formed on the lower plate of the alignment jig, and the penetration part is formed in the upper plate thereof. Accordingly, after the Velcro structure is inserted and fixed into the accommodation groove of the guide part, when the leather sheet is placed thereon and the upper plate is closed, the leather sheet and the Velcro structure are aligned automatically, and then, when sewing is performed through the penetration part of the upper plate, the Velcro structure can be accurately aligned and coupled on a predetermined curved path of the leather sheet.

Accordingly, when the seat cover is coupled with the foam pad, the Velcro structure of the seat cover is accurately coupled with the Velcro loop formed at the groove of the foam pad, such that the leather sheet of the seat cover can be firmly adhered and fixed to the foam pad without misalignment, thereby remarkably enhancing the quality of the vehicle seat.

Furthermore, as described above, after the Velcro structure is inserted into the guide part of the lower plate, when the leather sheet is placed thereon and the upper plate is closed, since the leather sheet and the Velcro structure are aligned automatically, there is no need to perform alignment work for the Velcro structure and the leather sheet. Therefore, the working speed in the process of manufacturing the seat cover by coupling the Velcro structure to the leather sheet is accelerated, thereby remarkably enhancing the productivity.

The effects and advantages of the present invention are not limited to the above-mentioned advantages, and other advantages, which are not specifically mentioned herein, will be clearly understood by those skilled in the art from the following description.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Referring to the attached drawings, preferred embodiments of the present invention will be described in more detail. For the sake of clarity, technical parts that have already been provided may be omitted or condensed in the description.

Hereinafter, an alignment jig for leather sheet and a Velcro structure for manufacturing a vehicle seat cover according to a preferred embodiment of the present invention will be described in detail with reference to the attached drawings.

Figure 1:
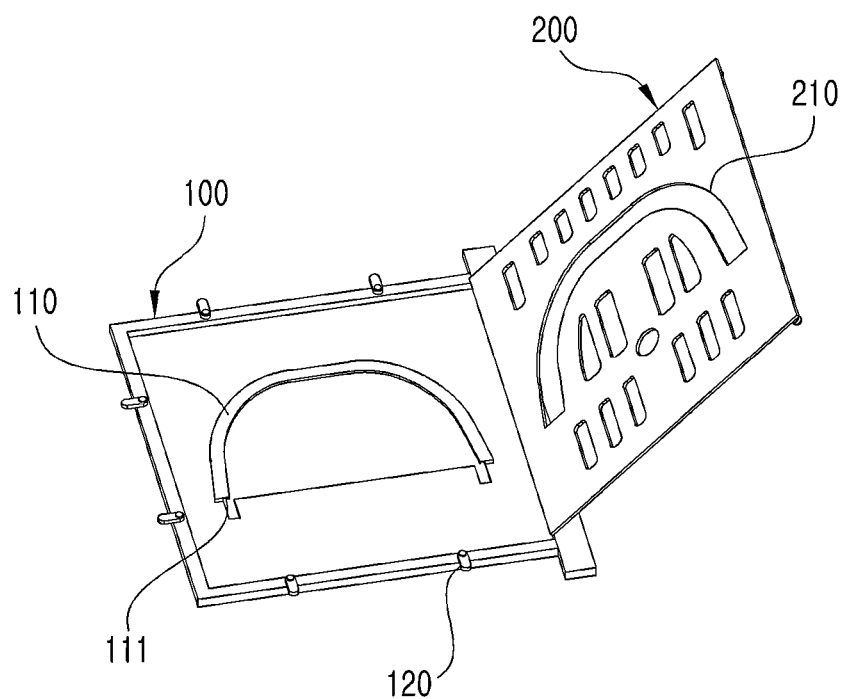
FIG. 1 is a perspective view illustrating a state in which an upper plate of an alignment jig for leather sheet and a Velcro structure for manufacturing a vehicle seat cover according to a preferred embodiment of the present invention is opened.
Figure 2:
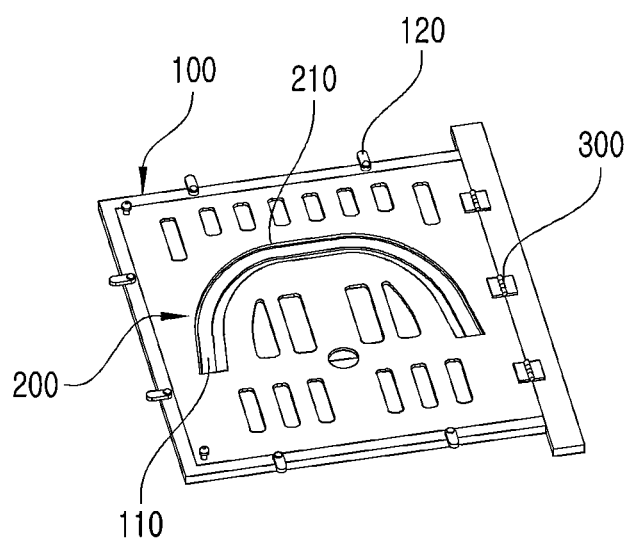
FIG. 2 is a perspective view illustrating a state in which the upper plate of the alignment jig for the leather sheet and the Velcro structure for manufacturing a vehicle seat cover according to a preferred embodiment of the present invention is closed.
Figure 3:
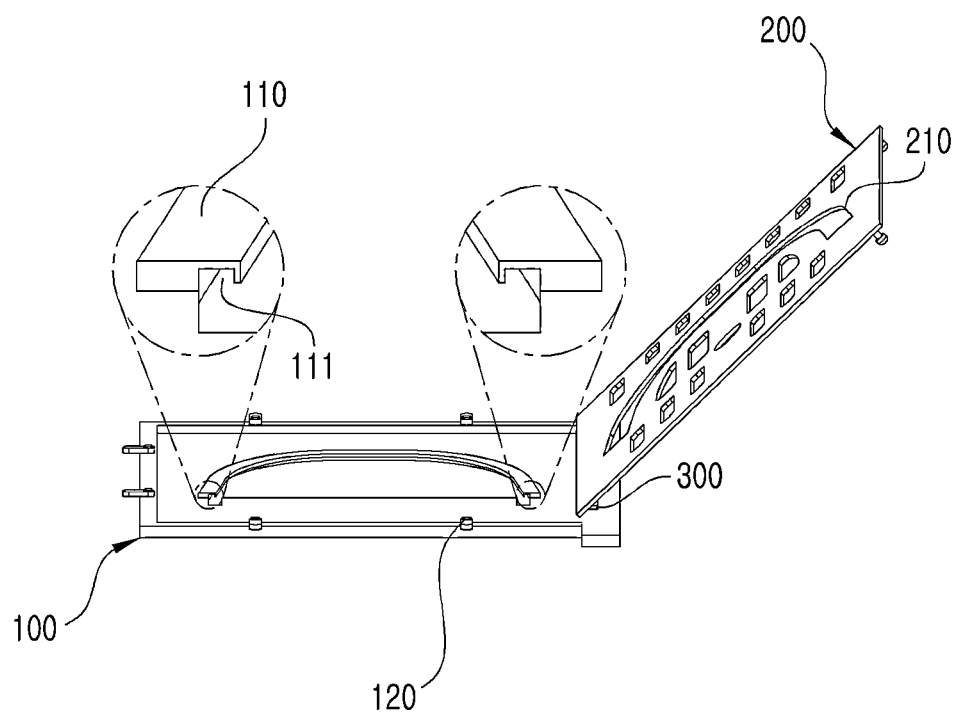
FIG. 3 is a partially enlarged view illustrating an accommodation groove formed in a guide part of a lower plate of the alignment jig for the leather sheet and the Velcro structure for manufacturing a vehicle seat cover according to a preferred embodiment of the present invention.
Figure 4:
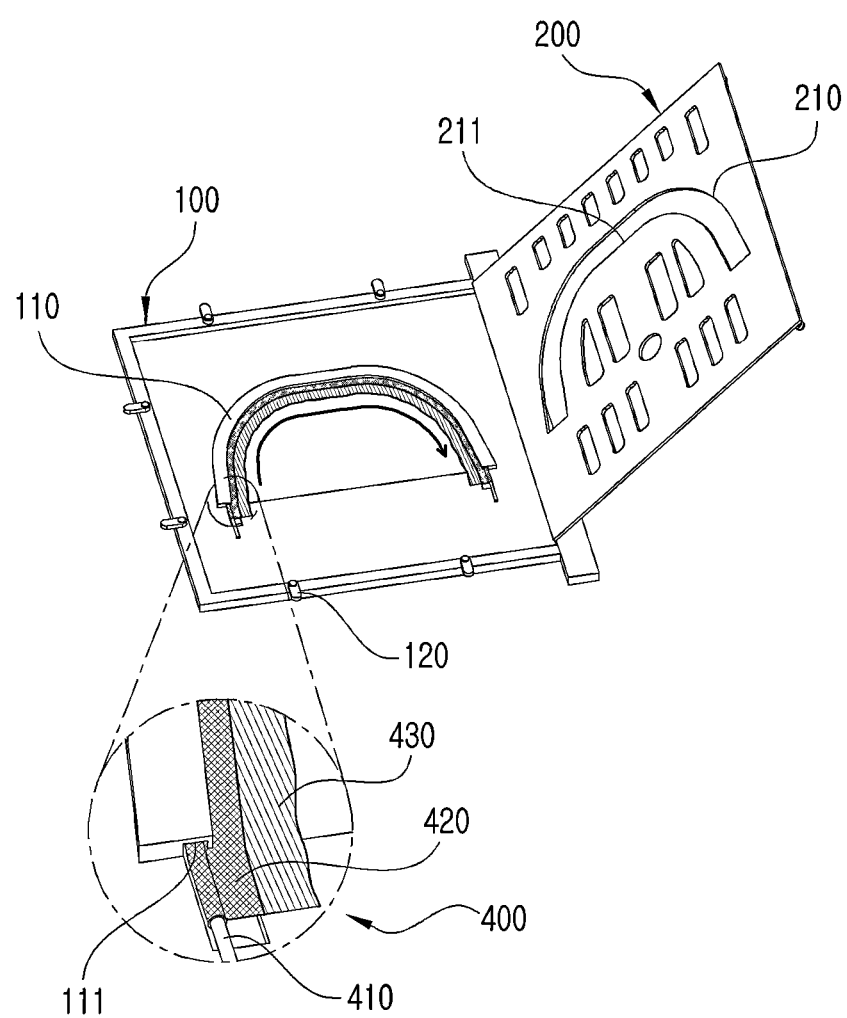
FIG. 4 is a view illustrating a state in which the Velcro structure is inserted and fixed into the accommodation groove of the guide part of the lower plate in the state in which the upper plate of the alignment jig for the leather sheet and the Velcro structure for manufacturing the vehicle seat cover according to a preferred embodiment of the present invention is opened.
Figure 5:
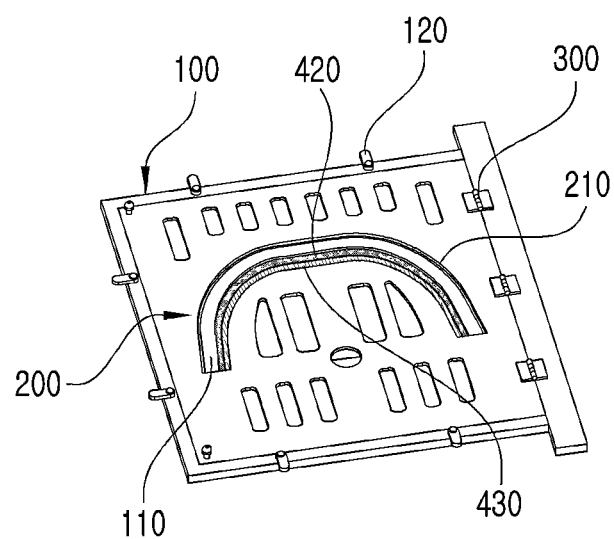
FIG. 5 is a view illustrating a closed state of the upper plate in the state in which the Velcro structure is inserted and fixed into the accommodation groove of the guide part of the lower plate of the alignment jig for the leather sheet and the Velcro structure for manufacturing the vehicle seat cover according to a preferred embodiment of the present invention.
Figure 6:
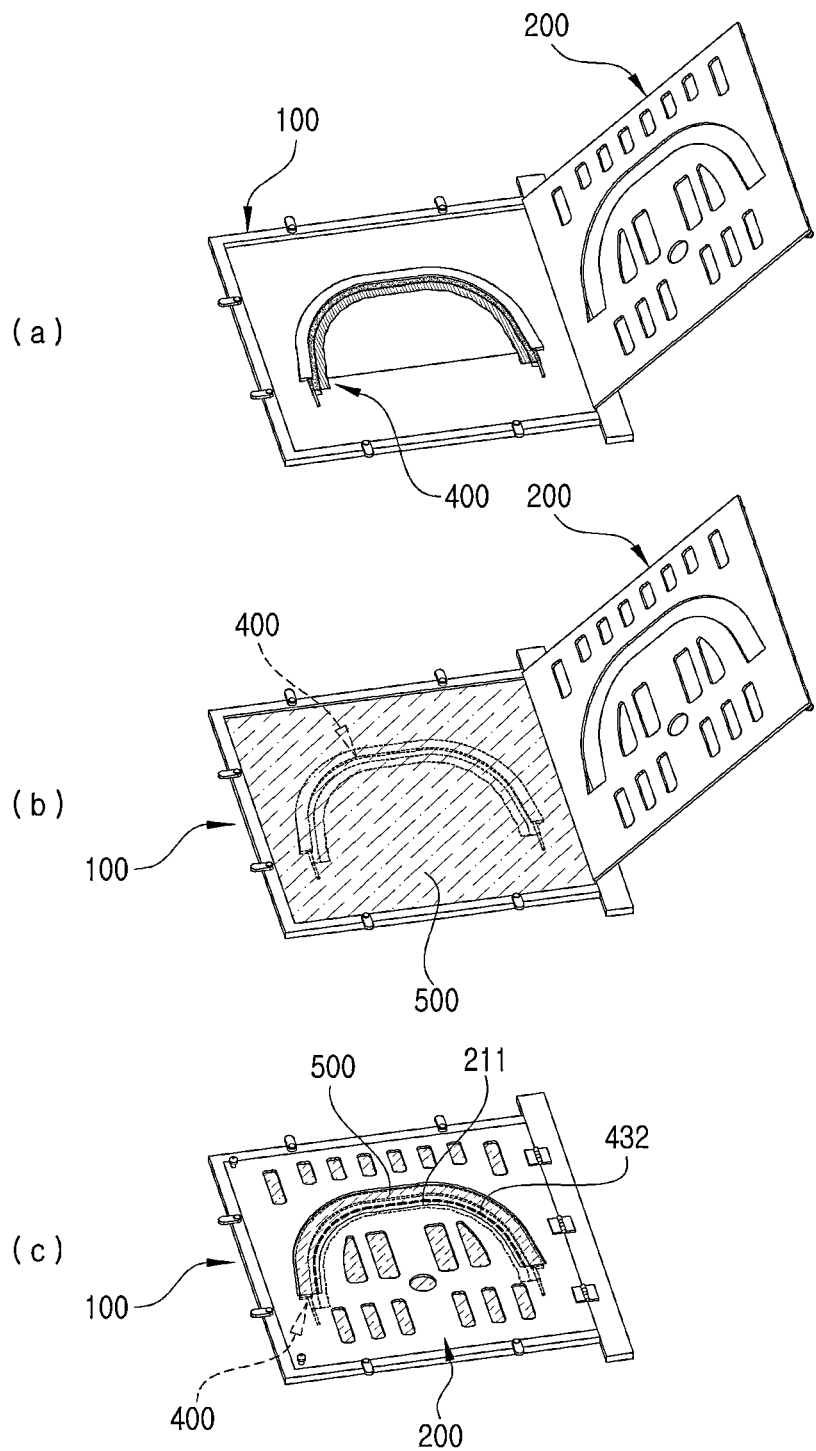
FIG. 6 is a diagram illustrating the process of coupling the Velcro structure to the leather sheet using the alignment jig for the leather sheet and the Velcro structure for manufacturing the vehicle seat cover according to a preferred embodiment of the present invention.
Figure 7:
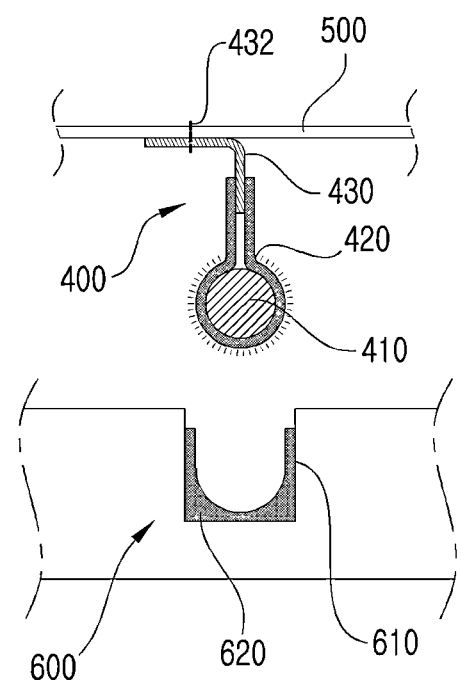
FIG. 7 is a schematic diagram illustrating a coupling structure of a seat cover and a foam pad manufactured by the alignment jig for the leather sheet and the Velcro structure for manufacturing the vehicle seat cover according to a preferred embodiment of the present invention.

FIG. 1 is a perspective view illustrating a state in which an upper plate of an alignment jig for leather sheet and a Velcro structure for manufacturing a vehicle seat cover according to a preferred embodiment of the present invention is opened, FIG. 2 is a perspective view illustrating a state in which the upper plate of the alignment jig for the leather sheet and the Velcro structure for manufacturing a vehicle seat cover according to a preferred embodiment of the present invention is closed, FIG. 3 is a partially enlarged view illustrating an accommodation groove formed in a guide part of a lower plate of the alignment jig for the leather sheet and the Velcro structure for manufacturing a vehicle seat cover according to a preferred embodiment of the present invention, FIG. 4 is a view illustrating a state in which the Velcro structure is inserted and fixed into the accommodation groove of the guide part of the lower plate in the state in which the upper plate of the alignment jig for the leather sheet and the Velcro structure for manufacturing the vehicle seat cover according to a preferred embodiment of the present invention is opened, FIG. 5 is a view illustrating a closed state of the upper plate in the state in which the Velcro structure is inserted and fixed into the accommodation groove of the guide part of the lower plate of the alignment jig for the leather sheet and the Velcro structure for manufacturing the vehicle seat cover according to a preferred embodiment of the present invention, FIG. 6 is a diagram illustrating the process of coupling the Velcro structure to the leather sheet using the alignment jig for the leather sheet and the Velcro structure for manufacturing the vehicle seat cover according to a preferred embodiment of the present invention, and FIG. 7 is a schematic diagram illustrating a coupling structure of a seat cover and a foam pad manufactured by the alignment jig for the leather sheet and the Velcro structure for manufacturing the vehicle seat cover according to a preferred embodiment of the present invention.

As illustrated in FIGS. 1 to 7, the alignment jig for the leather sheet and the Velcro structure for manufacturing the vehicle seat cover according to a preferred embodiment of the present invention (hereinafter, called 'alignment jig'), which is to accurately align and couple a Velcro structure 400 on a predetermined curved-shaped path of a leather sheet 500 by aligning the leather sheet 500 and the Velcro structure 400 before sewing work of coupling the leather sheet 500 and the Velcro structure 400 to manufacture a vehicle seat cover formed by the leather sheet 500 and the Velcro structure 400, includes: a lower plate 100 accommodating the Velcro structure 400 and the leather sheet 500; and an upper plate 200 rotating by being coupled to the lower plate 100 via a hinge shaft 300, wherein the lower plate 100 has a locking device 120 fixing the upper plate 200 in a closed state.

Accordingly, when a worker unlocks the locking device 120 of the lower plate 100, lifts the upper plate 200, places the leather sheet 500 on the lower plate 100, closes the upper plate 200, and fixes the upper plate 200 through the locking device 120, the leather sheet 500 is perfectly fixed to the alignment jig.

The lower plate 100 of the alignment jig is provided with a guide part 110 into which the Velcro structure 400 can be inserted and fixed.

Specifically, the guide part 110 is formed on the lower plate 100 in a curved shape, and has an accommodation groove 111 formed on the inner side for inserting the Velcro structure 400 as illustrated in FIG. 3. In this instance, as illustrated in FIGS. 4 and 7, the Velcro structure 400 includes: a circular core 410 made of a flexible material; a Velcro hook 420 formed to wrap around the outer surface of the core 410; and a connection member 430 protruding laterally in a coupled state with the Velcro hook 420.

Thus, when the Velcro structure 400 is inserted and fixed into the accommodation groove 111 of the guide part 110, as illustrated in FIG. 4, the core 410 and the Velcro hook 420 are inserted into the accommodation groove 111, and the connection member 430 protrude to the side of the accommodation groove 111.

Meanwhile, the upper plate 200 has a penetration part 210 formed at a position corresponding to the guide part 110 of the lower plate 100. As illustrated in FIG. 2, the penetration part 210 is formed in a wider area than the guide part 110. So, when the upper plate 200 is closed in the state in which the Velcro structure 400 is inserted and fixed into the accommodation groove 111 of the guide part 110 of the lower plate 100, as illustrated in FIG. 5, the connection member 430 of the Velcro structure 400 is exposed through the penetration part 210 of the upper plate 200.

Accordingly, when the sewing work is performed along an inner edge 211 of the penetration part 210 of the upper plate 200 in the state in which the upper plate 200 is closed to couple the leather sheet 500 and the connection member 430, the leather sheet 500 and the connection member 430 can be coupled. Further detailed description will be provided below.

Hereinafter, with reference to the drawings, a detailed description on the process of coupling the Velcro structure 400 and the leather sheet 500 using the alignment jig for the leather sheet and the Velcro structure for manufacturing the vehicle seat cover according to a preferred embodiment of the present invention will be provided.

First, as illustrated in FIGS. 4 and 6(*a*), the upper plate 200 of the alignment jig is lifted open from the lower plate 100, and then the Velcro structure 400 is inserted and fixed into the accommodation groove 111 of the open guide part 110 of the lower plate 100.

Specifically, one end of the Velcro structure 400 is inserted into one end of the accommodation groove 111 of the guide part 110 so that the core 410 and the Velcro hook 420 are inserted into the accommodation groove 111. Thereafter, when the worker holds the connection member 430 protruding laterally and pulls the connection member 430 till the end of the Velcro structure 400 reaches the other end of the accommodation groove 111, the Velcro structure 400 is fully inserted into the accommodation groove 111 of the guide part 110 and is fixed in a curved shape.

Subsequently, as illustrated in FIG. 6(*b*), when the leather sheet 500 is placed onto the lower plate 100, the leather sheet 500 is positioned on top of the Velcro structure 400 that is inserted and fixed into the accommodation groove 111 of the guide part 110.

Next, when the worker closes the upper plate 200 and fixes the upper plate 200 through the locking device 120, the leather sheet 500 is completely fixed.

Then, when the leather sheet 500 and the connection member 430 are coupled via sewing work along the inner edge 211 of the penetration part 210 of the upper plate 200, the leather sheet 500 and the Velcro structure 400 are coupled, thereby manufacturing a seat cover where the Velcro structure 400 are fixed on one side of the leather sheet 500 in a curved shape.

In this instance, as described above, the lower plate 100 of the alignment jig has the guide part 110 having the accommodation groove 111 in which the Velcro structure 400 can be inserted and fixed and the upper plate 200 has the penetration part 210. The Velcro structure 400 is inserted into the accommodation groove 111 of the guide part 110, and then the leather sheet 500 is placed and the upper plate 200 is closed. Consequently the Velcro structure 400 and the leather sheet 500 are automatically aligned. Thereafter, when the sewing work is performed along the edge 211 of the penetration part 210 of the upper plate 200, the Velcro structure 400 can be accurately aligned and coupled on the predetermined curved path.

Furthermore, as described above, after the Velcro structure 400 is inserted into the guide part 110 of the lower plate 100, and then the leather sheet 500 is placed and the upper plate 200 is closed to the lower plate 100. Since the Velcro structure 400 and the leather sheet 500 are automatically aligned, there is no need to perform the alignment work of the Velcro structure 400 and the leather sheet 500. Therefore, the working speed in the process of manufacturing the seat cover by coupling the Velcro structure to the leather sheet is accelerated, thereby remarkably enhancing the productivity.

Meanwhile, in the seat cover manufactured through the above process, the Velcro hook 420 of the Velcro structure 400 of the leather sheet 500 is connected to the Velcro loop 620 located inside a groove 610 formed in the foam pad 600, such that the leather sheet 500 is fixed to the surface of the foam pad 600 in a closely contacted state.

In this instance, since the Velcro structure 400 is accurately aligned on the predetermined curved path of the leather sheet 500 by using the alignment jig, when the seat cover is coupled with the foam pad 600, the Velcro structure 400 of the seat cover is accurately coupled with the Velcro loop formed at the groove 610 of the foam pad 600, such that the leather sheet 500 of the seat cover can be firmly adhered and fixed to the foam pad 600 without misalignment, thereby remarkably enhancing the quality of the vehicle seat.

as described above, in the alignment jig for the leather sheet and the Velcro structure for manufacturing the vehicle seat cover according to a preferred embodiment of the present invention, since the lower plate 100 of the alignment jig has the guide part 110 having the accommodation groove 111 in which the Velcro structure 400 can be inserted and fixed and the upper plate 200 has the penetration part 210, after the Velcro structure 400 is inserted into the accommodation groove 111 of the guide part 110, when the leather sheet 500 is placed and the upper plate 200 is closed, the Velcro structure 400 and the leather sheet 500 are automatically aligned. Thereafter, when the sewing work is performed through the penetration part 210 of the upper plate 200, the Velcro structure 400 can be accurately aligned and fixed to the leather sheet 500 along the predetermined curved path.

Therefore, when the seat cover is coupled with the foam pad 600, the Velcro structure 400 of the seat cover is accurately coupled with the Velcro loop formed at the groove 610 of the foam pad 600, such that the leather sheet 500 of the seat cover can be firmly adhered and fixed to the foam pad 600 without misalignment, thereby remarkably enhancing the quality of the vehicle seat.

Furthermore, as described above, after the Velcro structure 400 is inserted into the guide part 110 of the lower plate 100, when the leather sheet 500 is placed and the upper plate 200 is closed, since the Velcro structure 400 and the leather sheet 500 are automatically aligned, there is no need to perform the alignment of the Velcro structure 400 and the leather sheet 500. Therefore, the working speed in the process of manufacturing the seat cover by coupling the Velcro structure to the leather sheet is accelerated, thereby remarkably enhancing the productivity.

The detailed description of the present invention has been made based on the embodiments with reference to the accompanying drawings. However, the embodiments are provided only to illustrate the preferred examples of the present invention, and thus, the scope of the present invention should not be limited to the above embodiments, but should be construed by the claims and the equivalent concepts as described later.

What is claimed is:

1. An alignment jig for a leather sheet and a hook-and-loop fastener for manufacturing a vehicle seat cover, comprising:

a lower plate accommodating the hook-and-loop fastener and the leather sheet; and an upper plate configured to rotate by being coupled to the lower plate via a hinge shaft, wherein, the lower plate comprises a guide part configured for the hook-and-loop fastener to be inserted and fixed, wherein the upper plate comprises a penetration hole disposed at a position corresponding to the guide part, wherein the guide part comprises an accommodation groove having a curved shape along an entire length of the guide part and into which the hook-and-loop fastener is configured to be inserted, wherein the hook-and-loop fastener surrounds a flexible core and connected to a connection member extended from the hook-and-loop fastener and configured to connect to the leather sheet, and wherein the accommodation groove comprises an open portion on a surface opposite to the upper plate such that the flexible core is configured to be inserted into the open portion along the accommodation groove.

2. The alignment jig according to claim 1, wherein the penetration hole of the upper plate is formed in a wider area than the guide part of the lower plate.

* * * * *